W. B. Munger,
Pump Lever,

No. 44,879. Patented Nov. 1, 1864.

Attest:
Theo Tusch
Henry Harris

Inventor:
W B Munger

UNITED STATES PATENT OFFICE.

WILLIAM B. MUNGER, OF HILLSDALE, MICHIGAN.

IMPROVEMENT IN PUMPS.

Specification forming part of Letters Patent No. 44,879, dated November 1, 1864.

*To all whom it may concern:*

Be it known that I, WILLIAM B. MUNGER, of Hillsdale, in the county of Hillsdale and State of Michigan, have invented new and useful Improvements in Pumps; and I do hereby declare that the following is a full, clear, and exact description thereof, which will enable those skilled in the art to make and use the same, reference being had to the accompanying drawings, forming part of this specification, in which—

Figure 2:
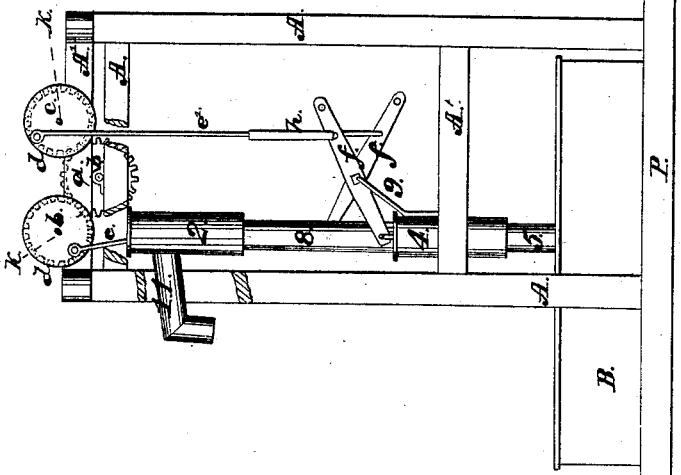
Figure 1:
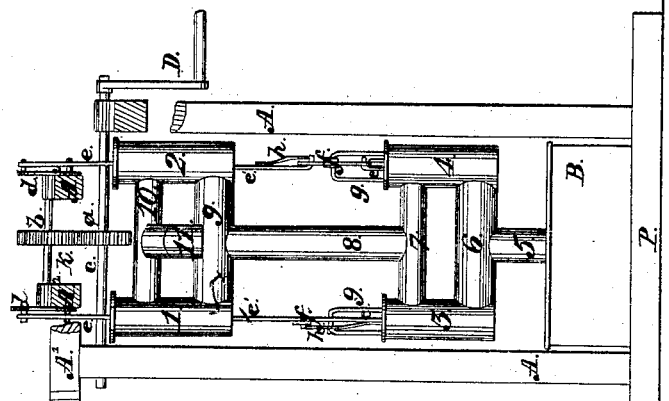

Figure 1 is a front, and Fig. 2 a side, elevation of a pump constructed after my invention.

Similar letters of reference indicate corresponding parts.

P is a platform surmounting the well. Upon it are supported four standards, A, connected by cross-pieces A', which are made the means of sustaining the various parts of the apparatus. B is a reservoir placed upon the platform between the standards. A pipe, 5, which leads to the well or other place from whence the water is to be drawn, passes down through the reservoir B, the joint around it being securely packed, so as to be water-tight. The pipe 5 connects above to a cross-pipe, 6, whose ends are connected to upright cylinders, 3 and 4, at their bottoms. The upper parts of these cylinders are connected by a pipe, 7, which is pierced at the middle of its length by an upright pipe, 8, which terminates above in a cross-pipe, 9, connecting vertical cylinders 1 and 2. The upper parts of these cylinders are also connected by a cross-pipe, 10, which is intersected by a discharge-pipe, 11, which empties downward into the reservoir beneath. The cylinders 1, 2, 3, and 4 are all open at top. The lower cylinders, 3 and 4, have brackets $g$ fastened to their sides, which sustain walking-beam levers $f$, to the inner ends of which are attached the piston-rods $e$, which work in the lower cylinders, 3 and 4. Their outer ends are connected to pitmen $e'$, which are fastened by pins to disks $d$ that are rigidly secured upon the ends of a shaft, like K, (not seen,) which revolves in bearings on the cross-pieces $A^2$. This shaft has a gear-wheel, $c$, rigidly secured upon it at the middle of its length, which gears with the driving pinion $a$, secured in like manner on the driving-shaft $a$. The shaft $a$ is rotated by means of a crank, D, or any other suitable devices for driving machinery. It is journaled in bearings upon the upper cross-pieces, A'. A gear-wheel, $b$, secured on the forward shaft, K, likewise engages with the pinion $a$. Its shaft K also carries disks $d$ at each end, to which are attached piston-rods $e$, working in the upper cylinders, 1 and 2. Each piston-rod carries a piston with a double-acting valve, the stroke of the piston being made within so much of the height of the cylinders as is contained between the mouths of the cross-pipes 6 and 7 and 9 and 10, respectively.

The piston-rods $e$ and pitman $e'$ are hooked into holes made for them in the walking-beam, and are held therein by means of flat springs $h$, which spring from the sides of the rods and pitman and bear against the opposite sides of the walking-beam from those which receive their hooks.

The course of the fluid through the apparatus is as follows: The shaft $a$ being rotated, the action of the pumps raise the fluid up through the pipes 5 and 6 into the cylinders 3 and 4, from whence it is driven by the pistons into the cross-pipe 7; from thence it is raised by the upper pumps through the vertical pipe 8 into the cross-pipe 9 and into the cylinders 1 and 2, from whence it is driven into the upper cross-pipe, 10, through which it flows into the discharging-pipe 11.

The order of the movements of the several pistons is determined, of course, by the positions on the several disks $d$ of the pins, to which the pistons $e$ and pitman $e'$ are attached; or, in other words, by the angular distances from each other of the planes in which the several pins are placed.

The object of my invention is to provide means for raising water from mines and other low places by means of a succession of reservoirs and pumps at different elevations, all connected together and driven from the same shaft, so as to economize machinery and attendance.

I have shown only two series of pumps and reservoirs; but there may be as many as can be driven by the power employed. The accumulation of water in the reservoir B is to be got rid of by a connecting-pipe. (Not shown.)

I claim as new and desire to secure by Letters Patent—

The apparatus for raising water from mines and other places by means of two or more series of pumps, arranged so that two pumps shall work with the same connections at each successive elevation or in each series, substantially as above described.

WILLIAM B. MUNGER.

Witnesses:
H. J. KING,
J. S. LEE.